United States Patent
Murakami et al.

(10) Patent No.: US 6,803,687 B2
(45) Date of Patent: Oct. 12, 2004

(54) ELECTRIC MOTOR HAVING SPEED REDUCING MECHANISM

(75) Inventors: Seiichi Murakami, Hamamatsu (JP); Akio Ohshiro, Hamamatsu (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/636,703

(22) Filed: Aug. 8, 2003

(65) Prior Publication Data

US 2004/0046465 A1 Mar. 11, 2004

(30) Foreign Application Priority Data

| Sep. 6, 2002 | (JP) | 2002-261862 |
| Sep. 6, 2002 | (JP) | 2002-261863 |
| Sep. 6, 2002 | (JP) | 2002-261864 |

(51) Int. Cl.$^7$ .......................................... H02K 11/00
(52) U.S. Cl. .......................................... 310/71; 310/89
(58) Field of Search .......................... 310/71, 67 R, 310/75 R, 89, 231, 238, 249

(56) References Cited

U.S. PATENT DOCUMENTS

| 5,204,565 A | * 4/1993 | Sekine et al. ............. 310/71 |
| 5,218,255 A | * 6/1993 | Horiguchi ................. 310/71 |
| 5,656,878 A | 8/1997 | Nakata |
| 5,691,585 A | 11/1997 | Shoda |
| 5,864,188 A | 1/1999 | Gerrand et al. |
| 5,983,484 A | 11/1999 | Harada et al. |
| 6,201,326 B1 | * 3/2001 | Klappenbach et al. ..... 310/75 R |
| 6,653,754 B2 | * 11/2003 | Uchida et al. ............. 310/51 |
| 6,756,711 B2 | * 6/2004 | Matsuyama et al. ....... 310/68 R |

* cited by examiner

*Primary Examiner*—Thanh Lam
(74) *Attorney, Agent, or Firm*—Posz & Bethards, PLC

(57) ABSTRACT

A unit plate, which holds electric circuit components including power supply terminals, is secured to a housing cover, which is, in turn, connected to a housing to close an opening of the housing. The housing cover includes guide walls, which extend in a direction generally parallel to a fitting direction of an external connector to guide the unit plate in such a manner that a second end of each power supply terminal held by the unit plate is received in a connector housing part of the housing cover, which is connected with the external connector, at time of installing the unit plate to the housing cover. The unit plate includes a rotation support arrangement, which rotatably supports a rotator. The electric circuit components also include stationary contact members, each of which includes a contact section that is slidably engageable with a movable contact of the rotor.

20 Claims, 7 Drawing Sheets

ELECTRIC MOTOR HAVING SPEED REDUCING MECHANISM

CROSS REFERENCE TO RELATED APPLICATION

This application is based on and incorporates herein by reference Japanese Patent Application No. 2002-261862 filed on Sep. 6, 2002, Japanese Patent Application No. 2002-261863 filed on Sep. 6, 2002 and Japanese Patent Application No. 2002-261864 filed on Sep. 6, 2002.

BACKGROUND OF THE INVENTION

1. Field of the Invention

The present invention relates to an electric motor having a speed reducing mechanism.

2. Description of Related Art

One previously proposed motor used in, for example, a vehicle wiper system includes a housing (gear housing) and a housing cover. The housing supports a speed reducing mechanism and an output shaft, and the housing cover is connected to the housing. The motor also includes electric circuit components, such as a movable contact, stationary contacts, terminals and noise limiter elements. Here, the movable contact is rotated synchronously with rotation of the output shaft, and the stationary contacts are slidably engageable with the movable contact. In one such a motor disclosed, for example, in Japanese Unexamined Patent Publication No. 7-245904 (corresponding to U.S. Pat. No. 5,656,878), a receiving portion, i.e., a storage case, is formed in an outer surface of the housing cover (outer surface that is opposite from the housing), and the terminals and the noise limiter elements are received in the receiving portion, so that electrical insulation of the terminals and the noise limiter elements with respect to the movable contact and the stationary contacts arranged in an inner surface of the housing cover is ensured.

However, in this motor, a cover, which closes the receiving portion, is required. Furthermore, it is required to water tightly seal the cover by, for example, application of sealant.

There has been proposed another motor, which includes a unit (unit plate) having the electric circuit components described above. The unit plate is received inside the housing and the housing cover. However, in such a motor, when a size of the motor is reduced, a space between the unit plate and the movable contact is reduced. Thus, it is difficult to achieve the electrical insulation between the terminals and the movable contact (moving member).

Furthermore, an example of the motor having the unit plate, which is attached to an inner surface of the housing cover, is disclosed in Japanese Unexamined Patent Publication No. 8-275441 (corresponding to U.S. Pat. No. 5,691,585). This motor includes a case frame (i.e., a housing), which receives a speed reducing mechanism, a case cover (i.e., a housing cover), which closes an opening of the case frame, and a support plate (i.e., a unit plate), which is attached to an inner surface of the case cover. The case cover includes a connector housing part. The connector housing part is shaped into a tubular form, which extends in a direction perpendicular to the closing direction, and is engaged with an external connector. The support plate includes a terminal side half and an output shaft side half, which are separately provided. The support plate is formed as a unit, in which electric circuit components that include power supply connector terminals are secured. When the support plate is installed to the case cover, the power supply connector terminals are received in the connector housing part. When the external connector is fitted to or engaged with the connector housing part, the power supply connector terminals are connected with corresponding terminals of the external connector. In the above-described motor, a shaft support arrangement and securing projections, which support a contact plate (i.e., a movable contact) having a predetermined pattern, protrude from a surface of the case cover, to which the support plate is installed. The support plate (more specifically, the output shaft side half) includes a through hole for receiving the shaft support arrangement and through holes for receiving the securing projections.

In the above motor, at the time of assembly, first, the support plate is angled relative to the case cover and is positioned to guide and to insert the power supply connector terminals into the connector housing part. Then, the support plate is gradually tilted downwardly such that the support plate is arranged along the inner surface of the case cover, and the shaft support arrangement and the securing projections are received in the corresponding through holes of the support plate. That is, the support plate is angled and is lowered (i.e., approached) toward the case cover in such a manner that the support plate is slid to guide and to insert the power supply connector terminals into the connector housing part. Then, the angled support plate is further lowered (i.e., approached) toward the case cover while positioning the support plate in such a manner that the shaft support arrangement and the securing projections are received in the corresponding through holes of the support plate. Thus, the two or more directional movements need to be simultaneously performed to install the support plate to the case cover. As a result, in the above motor, the installation operation is disadvantageously complicated and becomes tedious. Furthermore, when automatic assembly is performed, this will cause an increased complexity of an assembly device (device should be capable of performing the tilt positional control and is also capable of simultaneously performing the two or more directional movements), resulting in an increase in the manufacturing costs.

Furthermore, in the above motor, stationary contact members, which are stationary relative to the motor, are provided in a slidably engageable manner with respect to the movable contact. With this arrangement, rotation (angle) of the output shaft can be measured. Through engagement/disengagement between the stationary contact members and the movable contact according to the pattern, a wiper arm (wiper blade) is moved to a predetermined stop position located along a lower edge of a vehicle window glass and is automatically stopped even when the wiper arm (wiper blade) is still in a wiping position.

However, in the above motor, the movable contact is supported by the housing cover, and the stationary contact members, which are slidably engageable with the movable contact, are secured to the support plate, which is, in turn, secured to the housing cover. Thus, a positional relationship between the movable contact and the stationary contact members is affected by assembly errors of the support plate and of the housing cover. When the positional relationship between the movable contact and the stationary contact members is deviated from a predetermined positional relationship, measurement accuracy of a rotational angle of the output shaft, which is measured through the movable contact and the stationary contact members, is disadvantageously reduced. Particularly, in the case of the wiper motor, this will cause substantial deviation of the stop position of the wiper arm (wiper blade), which is connected to the motor through a link mechanism, from a predetermined stop position. Alternatively, this will cause substantial deviation of a reverse position of the wiper arm.

SUMMARY OF THE INVENTION

Thus, it is an objective of the present invention to provide a motor, which includes a movable contact and a unit plate securely holding electric circuit components and which allows a reduction in its size and effective electrical insulation.

It is another objective of the present invention to provide a motor, which includes a housing cover provided with a connector housing part shaped into a tubular form extending in a direction perpendicular to a closing direction of the housing cover and which allows easy installation of a unit plate, to which power supply terminals to be received in the connector housing part are secured, into the housing cover.

It is a further objective of the present invention to provide a motor capable of improving measurement accuracy of a rotational angle of an output shaft, which is measured through a movable contact and a stationary contact member.

To achieve the objectives of the present invention, there is provided an electric motor that includes a motor main body, a housing connected to the motor main body, a speed reducing mechanism received in the housing, a housing cover connected to the housing, and a unit plate secured to the housing cover in opposed relationship to the housing. The motor main body includes a rotor and a plurality of brushes, through which electric current is supplied to the rotor. The housing includes an opening. The speed reducing mechanism reduces rotational speed of the rotor and includes an output shaft to output rotational force. The housing cover closes the opening of the housing and includes a connector housing part, to which an external connector is fitted in a fitting direction, and the connector housing part is shaped into a tubular form that extends in the fitting direction of the external connector. The unit plate holds a plurality of electric circuit components. The plurality of electric circuit components includes at least one power supply terminal that includes first and second ends. The first end of each power supply terminal is connected to a corresponding one of the plurality of brushes, and the second end of each power supply terminal is connected to a corresponding terminal of the external connector. The housing cover further includes at least one guide wall, which extends in a direction generally parallel to the fitting direction of the external connector to guide the unit plate in such a manner that the second end of each power supply terminal held by the unit plate is received in the connector housing part at time of installing the unit plate to the housing cover.

To achieve the objectives of the present invention, there is also provided an electric motor that includes a motor main body, a housing connected to the motor main body, a speed reducing mechanism received in the housing, a housing cover connected to the housing and a unit plate secured to the housing cover in opposed relationship to the housing. The motor main body includes a rotor and a plurality of brushes, through which electric current is supplied to the rotor. The housing includes an opening. The speed reducing mechanism reduces rotational speed of the rotor and includes an output shaft to output rotational force. The housing cover closes the opening of the housing. The unit plate holds a plurality of electric circuit components. The electric motor further includes a rotator, which is rotated synchronously with rotation of the output shaft of the speed reducing mechanism and includes a movable contact, which is rotated together with the rotator and is made of a conductive plate that is configured to have a predetermined pattern. The unit plate includes a rotation support arrangement, which rotatably supports the rotator. The plurality of electric circuit components includes at least one stationary contact member. Each stationary contact member includes a contact section, which is slidably engageable with the movable contact.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A wiper motor of a vehicle wiper system according to an embodiment of the present invention will be described with reference to FIGS. 1–12.

Figure 1:
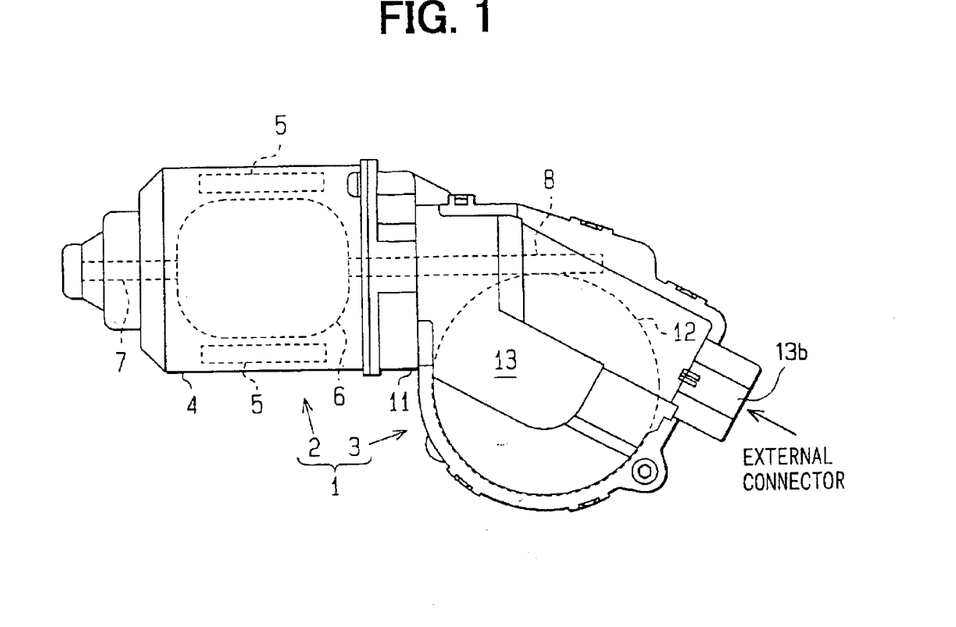
FIG. 1 is a schematic view of a motor according to an embodiment.

As shown in FIG. 1, a motor 1 includes a motor main body 2 and a speed reducing unit 3. The motor main body 2 includes a cup shaped yoke housing 4, a plurality of magnets 5 secured to an inner peripheral surface of the yoke housing 4, and a rotor 6 received in the yoke housing 4. The rotor 6 includes a rotatable shaft 7. A worm 8 is formed in a distal end side of the rotatable shaft 7, which protrudes from an opening of the yoke housing 4.

Figure 2:
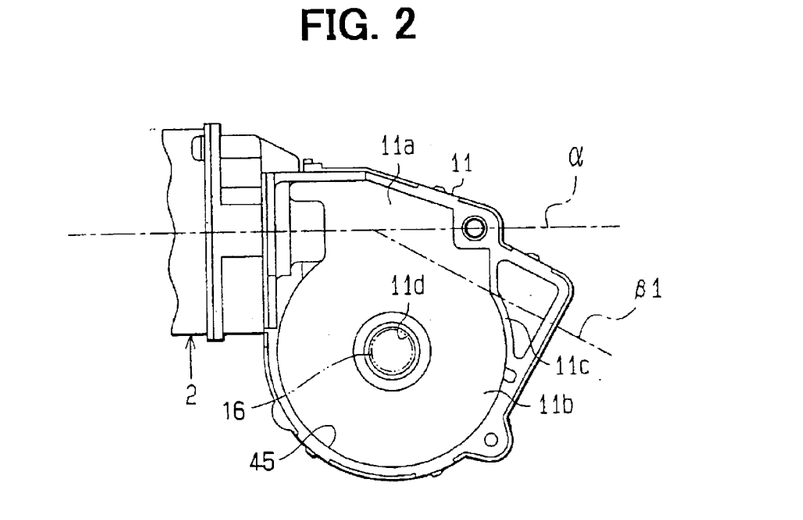
FIG. 2 is a descriptive view for describing a housing of the present embodiment.
Figure 3:
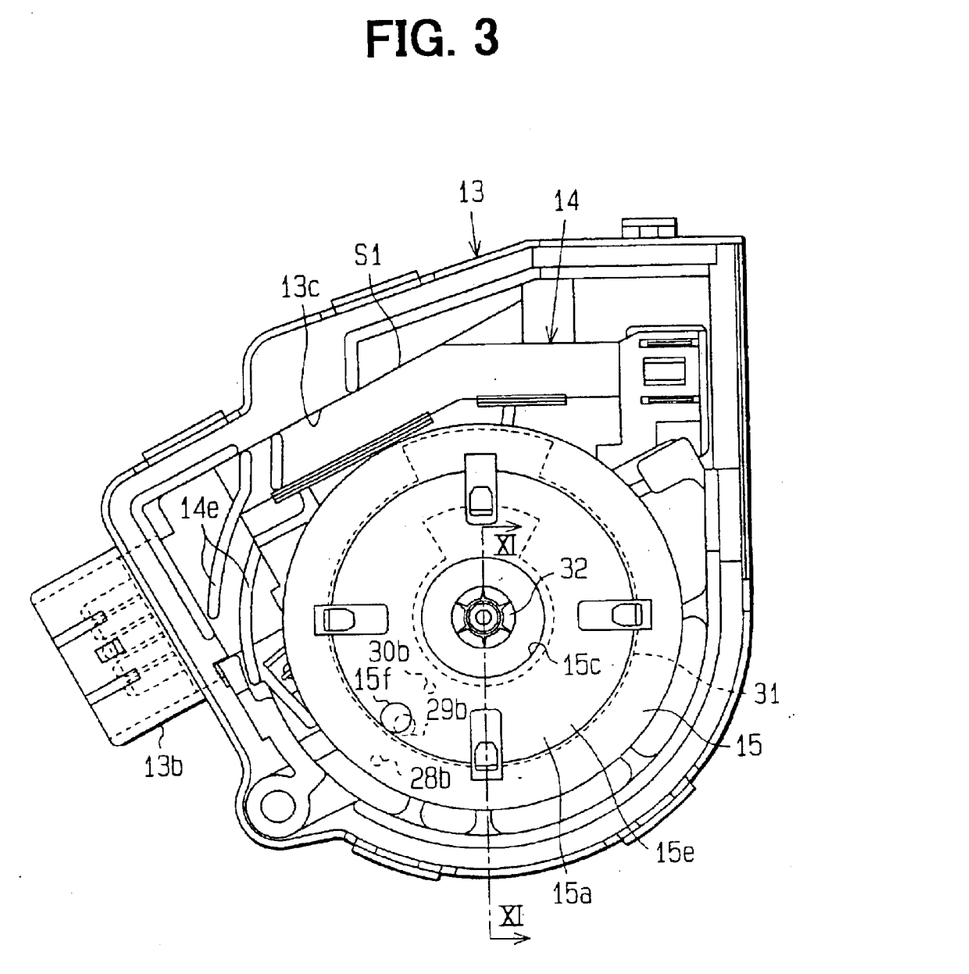
FIG. 3 is a descriptive view for describing housing cover side components of the present embodiment.

The speed reducing unit 3 includes a housing 11 (FIG. 2), a worm wheel 12, a housing cover 13, a unit plate 14 (FIG. 6) and a rotator 15 (FIG. 3). In the present embodiment, the worm 8 and the worm wheel 12 constitute a speed reducing mechanism, more specifically, a single stage worm speed reducing mechanism for reducing rotational speed of the rotor 6. As shown in FIG. 2, the housing 11 includes a worm receiving recess 11a, which receives the worm 8, and a wheel receiving recess 11b, which is communicated with the worm receiving recess 11a. Furthermore, in the housing 11, a predetermined portion of an inner peripheral wall of the wheel receiving recess 11b forms a housing side engaging wall 11c (described below in greater detail). The worm 8 is received in the worm receiving recess 11a. The worm wheel 12, which is meshed with the worm 8, is rotatably received in the wheel receiving recess 11b. FIG. 2 shows the housing 11, from which the housing cover 13 is removed, and in which the worm 8 and the worm wheel 12 are uninstalled. An output shaft 16, which is secured to integrally rotate with the worm wheel 12, projects outwardly from a through hole 11d formed in the center of the housing 11. The output shaft of the worm wheel is connected to each wiper arm (wiper blade) through, for example, a link mechanism (not shown).

Figure 4:
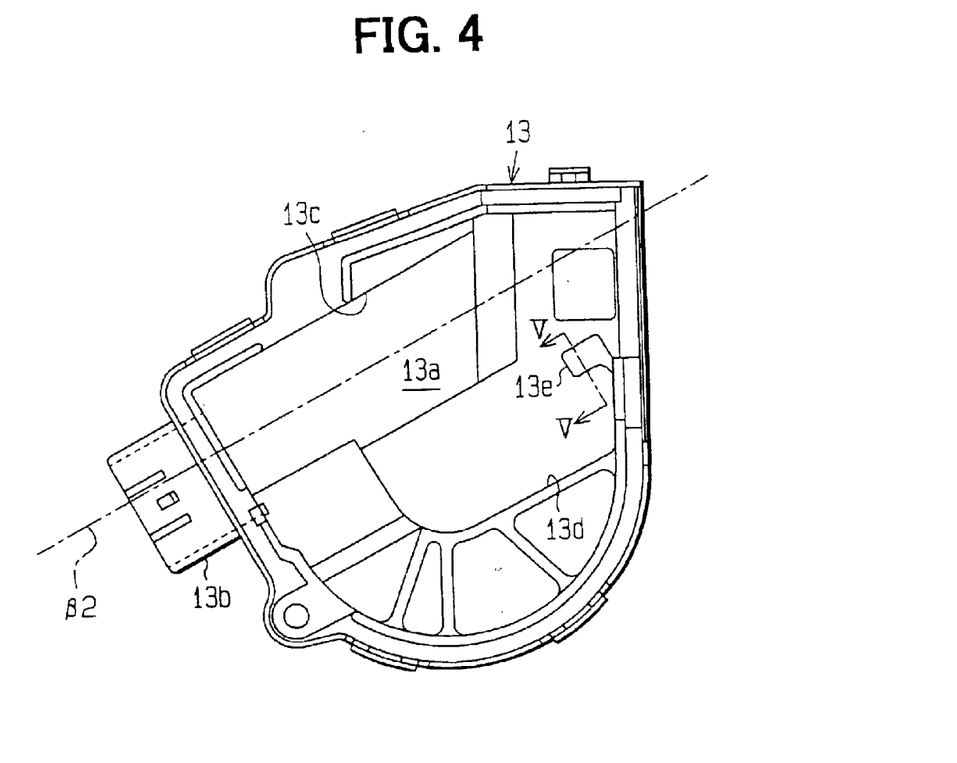
FIG. 4 is a descriptive view for describing a housing cover of the present embodiment.

As shown in FIG. 4, the housing cover 13 is made of a resin material and is formed into a generally plate form that is shaped to close an opening 45 of the housing 11 (i.e., the worm receiving recess 11a and the wheel receiving recess 11b). A unit receiving recess 13a is formed in the housing cover 13 to receive the unit plate 14. Furthermore, a connector housing part 13b extends from the housing cover 13 from one side (left lower angled side in FIG. 4) of the housing cover 13, which is opposite from the motor main body 2 and at which the angled wheel receiving recess 11b (FIG. 2) is present. The connector housing part 13b extends in a direction of an axis β1, which is angled relative to a direction of an axis α of the rotatable shaft 7 (worm 8) on the worm wheel 12 side.

Figure 5:
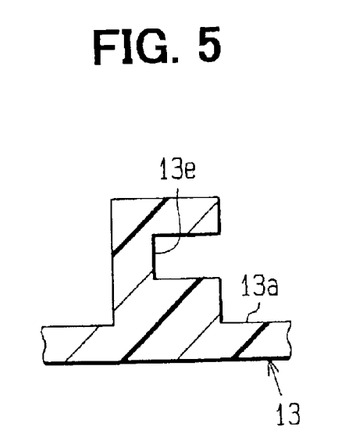
FIG. 5 is a cross sectional view along line V—V in FIG. 4.

The connector housing part 13b is communicated with a bottom part of the unit receiving recess 13a. The connector housing part 13b is shaped into a tubular form, which extends in the direction (i.e., the direction, which is obliquely and left-downwardly directed in FIG. 4, that is, a direction of an axis β2 that extends in a direction of insertion of a connector pin section described below (also referred to as a slide direction of the unit plate 14)) perpendicular to a closing direction of the housing cover 13 (i.e., a direction perpendicular to a plane of FIG. 4). Furthermore, the connector housing part 13b is engageable with an external connector (not shown). A portion of an inner peripheral wall of the unit receiving recess 13a forms first and second guide walls (described below) 13c, 13d, which are elongated in a direction generally parallel to the direction of extension of the connector housing part 13b (i.e., the direction of the axis β2 in FIG. 4). In the housing cover 13, a cover side temporal retainer 13e is formed in a side (right side in FIG. 4) where the motor main body 2 is secured. As shown in FIG. 5, the cover side temporal retainer 13e has a generally horseshoe shaped cross section in a plane, which extends perpendicular to the direction of extension of the connector housing part 13b (i.e., the direction of the axis β2 in FIG. 4).

Figure 6:
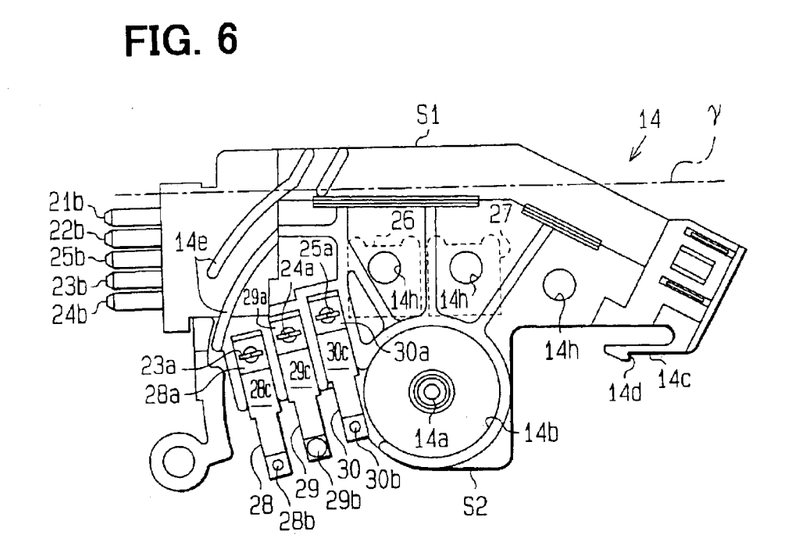
FIG. 6 is a descriptive view for describing a unit plate of the present embodiment.

The unit plate 14 is made of a dielectric material (resin material) and is made into a form, which corresponds to the unit receiving recess 13a, as shown in FIG. 6. Various electric circuit components described below are secured to the unit plate 14.

Figure 11:
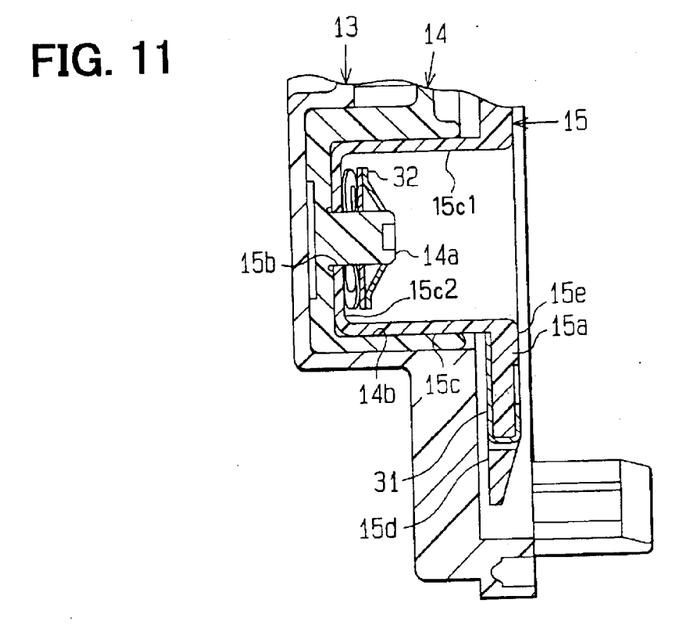
FIG. 11 is a cross sectional view along line XI—XI in FIG. 3.

A rotation support arrangement is provided in the unit plate 14 to rotatably support the rotator 15. The rotation support arrangement of the present embodiment protrudes at a location that is offset from the longitudinal center of the unit plate 14, which is the center of the unit plate 14 in a longitudinal direction of the unit plate 14 (i.e., a left-right direction in FIG. 6, that is, a direction of an axis γ). More specifically, the rotation support arrangement is offset in a direction (a downward direction in FIG. 6) perpendicular to the longitudinal direction of the unit plate 14. As shown in FIGS. 6 and 11, the rotation support arrangement includes a protruded spindle 14a and a peripheral wall 14b, which extends around the spindle 14a.

Figure 9:
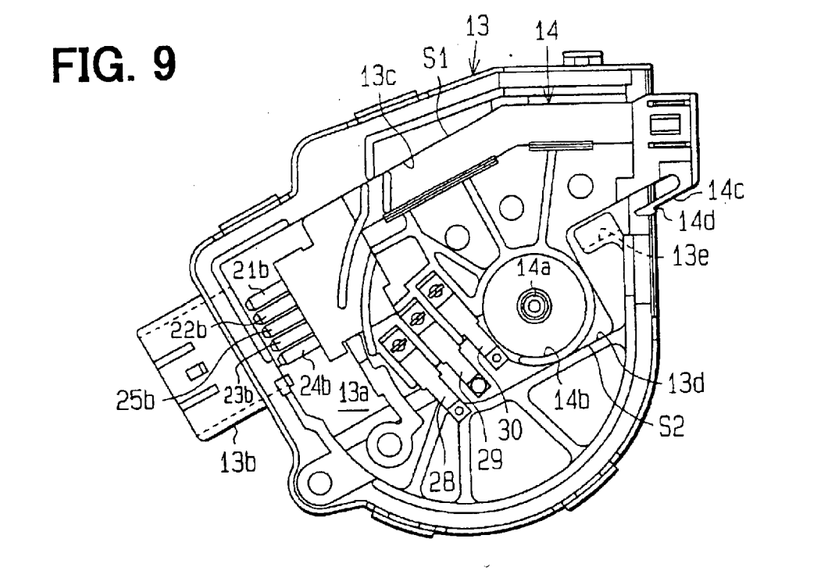
FIG. 9 is a descriptive view for describing the housing cover and the unit plate.
Figure 10:
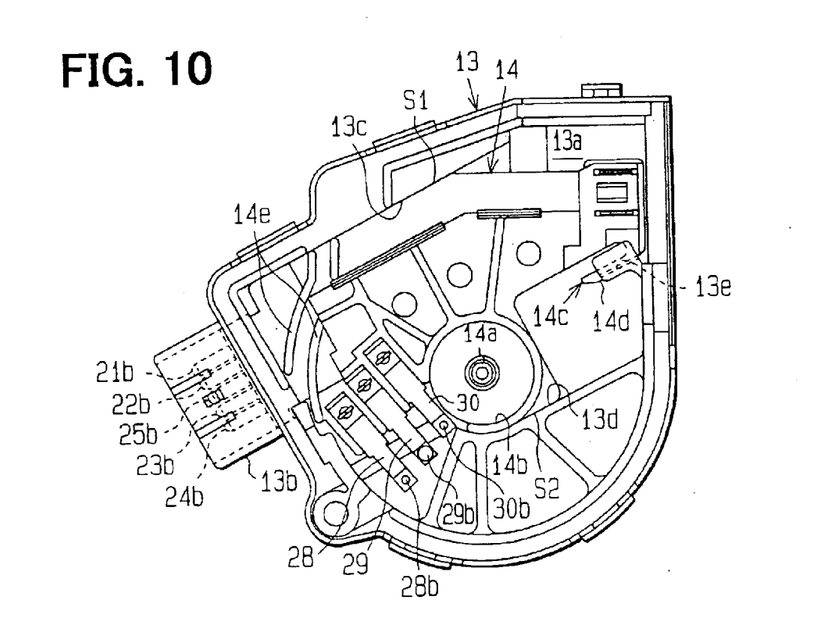
FIG. 10 is a descriptive view for describing the housing cover and the unit plate.

In the present embodiment, a first lateral surface S1 of the unit plate 14, which is one (upper one in FIG. 6) of two lateral surfaces of the unit plate 14 opposed in a transverse direction of the unit plate 14, is generally parallel with a second lateral surface S2 of the unit plate 14, which is the other one (lower one in FIG. 6 where the peripheral wall 14b is formed) of the two lateral surfaces of the unit plate 14. Furthermore, in the present embodiment, the first lateral surface S1 and the second lateral surface S2 are generally parallel to the direction of the longitudinal axis γ of the unit plate 14. A distance between the first lateral surface S1 and the second lateral surface S2 is substantially the same as a distance between the first guide wall 13c and the second guide wall 13d in the unit receiving recess 13a of the housing cover 13. A length of the first lateral surface S1 is shorter than a length of the first guide wall 13c, and a length of the second lateral surface S2 is shorter than a length of the second guide wall 13d. That is, as shown in FIGS. 9 and 10, the unit plate 14 is constructed in such a manner that the first and second surfaces S1, S2 are engaged with the first and second guide walls 13c, 13d, respectively, when the unit plate 14 is received in the unit receiving recess 13a. At that time, in the present embodiment, the longitudinal axis γ of the unit plate 14 is arranged generally parallel to the axis β2, which coincides with the direction of extension of the connector housing part 13b. Furthermore, as shown in FIGS. 9 and 10, when the unit plate 14 is received in the unit receiving recess 13a, the unit plate 14 is guided by the first and second guide walls 13c, 13d and is slidable in the direction (the direction of the axis β2, which coincides with the direction of extension of the connector housing part 13b) perpendicular to the closing direction of the housing cover 13.

The unit plate 14 includes a unit side temporal retainer 14c, which engages the cover side temporal retainer 13e to temporarily retain the unit plate 14 and the housing cover 13 together at a guide end position of the unit plate 14 guided by the first and second guide walls 13c, 13d. In the present embodiment, "the temporal retainment" means retainment of the temporarily assembled unit plate 14 and housing cover 13 (they are in a state before installation of the housing cover 13 to the housing 11) in a manner that allows maintenance of the retainment of the assembled unit plate 14 and housing 13 without causing detachment of the assembled unit plate 14 and housing cover 13 from one another even during, for example, transportation of the unit plate 14 and the housing cover 13. In the present embodiment, the cover side temporal retainer 13e, the unit side temporal retainer 14c, the connector housing part 13b, and the connector housing part 13b side end of the unit plate 14 cooperate together to form a temporal retainer arrangement. As shown in FIGS. 9 and 10, the unit side temporal retainer 14c of the present embodiment is resiliently deformable and is elongated at a position, which corresponds to the cover side temporal retainer 13e. Furthermore, the unit side temporal retainer 14c has a claw 14d at a distal end thereof. That is, when the unit plate 14 is guided along the first and second guide walls 13c, 13d, the unit plate 14 first flexes to allow insertion of the claw 14d into the cover side temporal retainer 13e. Furthermore, when the unit plate 14 is guided to the guide end position along the first and second guide walls 13c, 13d (i.e., right after passing of the claw 14d through the cover side temporal retainer 13e), the flexure of the unit side temporal retainer 14c is released, so that the claw 14d is engaged with the cover side temporal retainer 13e to restrain detachment of the claw 14d from the cover side temporal retainer 13e. Then, at the guide end position, the connector housing part 13b side end of the unit plate 14 is inserted into the connector housing part 13b. Thus, when the unit plate 14 is guided to the guide end position along the first and second guide walls 13c, 13d, the unit plate 14 is temporarily retained in a manner that restrains unexpected detachment of the unit plate 14 from the housing cover 13, more specifically, in a manner that restrains movement of the unit plate 14 in the closing direction of the cover 13 (direction perpendicular to the plane of FIG. 10) and also in the guide direction (the direction, which is obliquely and left-downwardly directed in FIG. 4 and coincides with the direction of the axis β2).

The unit plate 14 includes engaging walls 14e. When the housing cover 13, to which the unit plate 14 is retained (temporarily retained), closes the opening 45 of the housing 11, the engaging walls 14e are engaged with the engaging wall 11c of the hosing 11 (FIG. 2) to restrain movement of the unit plate 14 in the guide direction (i.e., in the direction generally parallel to the fitting direction of the external connector). In the present embodiment, the engaging wall 11c and the engaging walls 14e cooperate together to form a slide limiting arrangement. As shown in FIG. 10, at the guide end position of the unit plate 14 guided by the first and second guide walls 13c, 13d, the engaging walls 14e of the present embodiment are positioned adjacent to the connector housing part 13b. The engaging walls 14e are formed as a pair of engaging walls, which are placed to hold the engaging wall 11c therebetween when the opening 45 of the housing 11 is closed by the housing cover 13. Thus, when the housing cover 13 is installed to the housing 11, the unit plate 14 is held while the movement of the unit plate 14 in the guide direction (i.e., the direction, which is obliquely and left-downwardly directed in FIG. 10 and coincides with the direction of the axis β2) is substantially limited.

Figure 7:
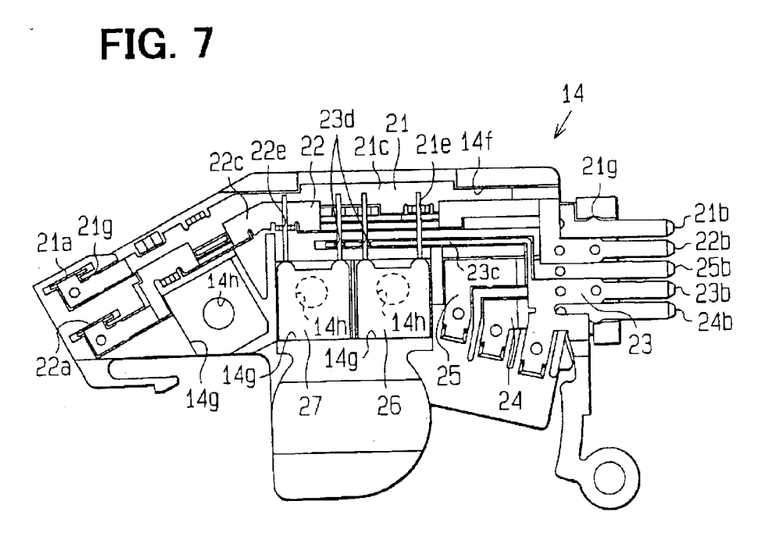
FIG. 7 is a descriptive view for describing the unit plate of the present embodiment.

As shown in FIGS. 6 and 7, the electric circuit components of the present embodiment include first and second power supply terminals 21, 22, first to third stationary contact terminals 23–25, first and second capacitors (serving as noise limiter elements) 26, 27 and first to third stationary contact members 28–30. The electric circuit components 21–27 other than the first to third stationary contact members 28–30 are arranged in one side surface (first side surface) of the unit plate 14, which is opposed to the housing cover 13.

Specifically, one end (first end) of each of the first and second power supply terminals 21, 22 is connected to a corresponding one of power supply brushes 43, 44 arranged in the motor main body 2, and the other end (second end) of each of the first and second power supply terminals 21, 22 is connected to a corresponding terminal of the external connector engaged with the connector housing part 13b.

Figure 8A:
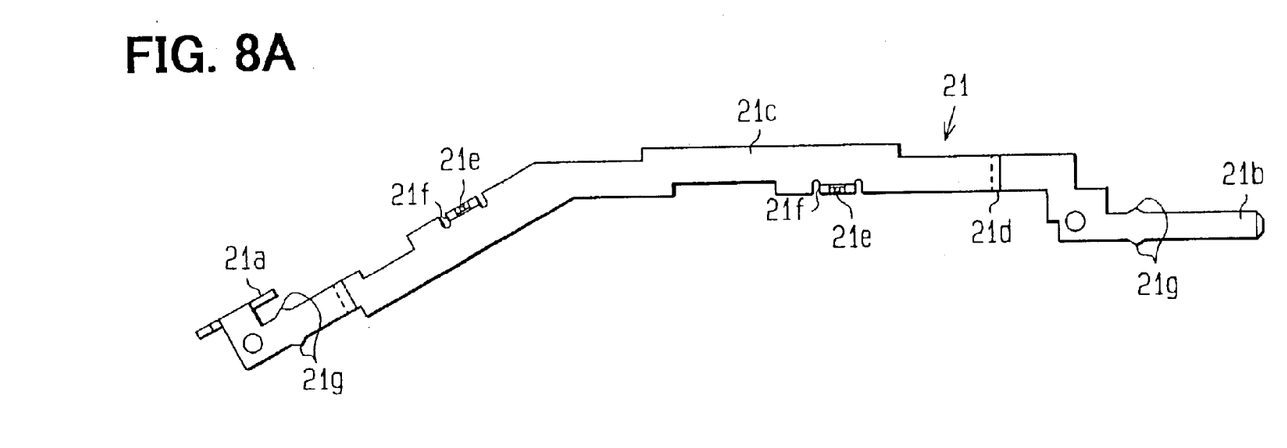
FIG. 8A is a plan view of a first power supply terminal of the present embodiment.
Figure 8B:
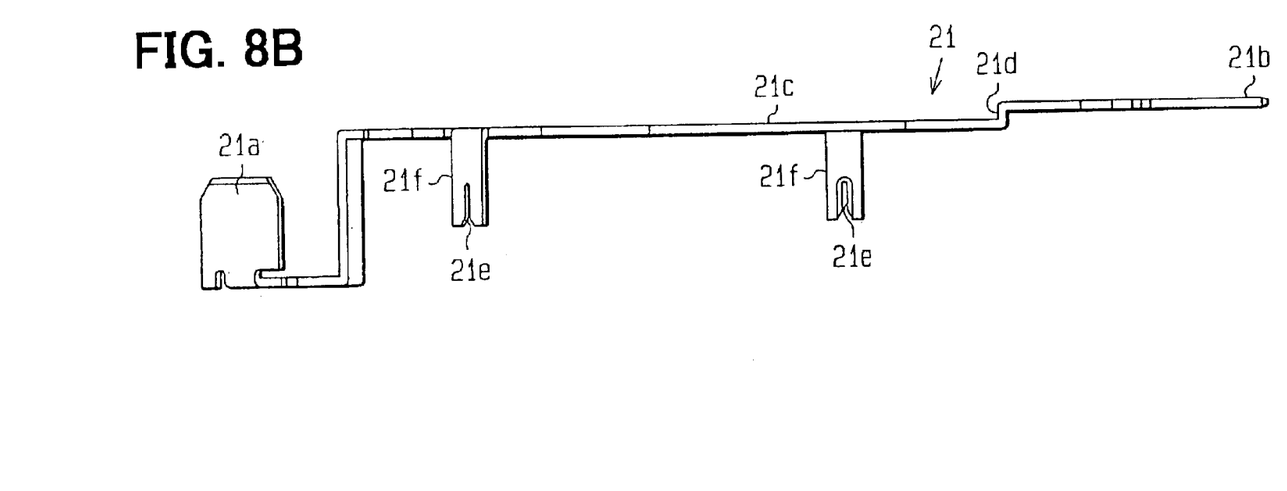
FIG. 8B is a side view of the first power supply terminal.

As shown in FIG. 8, the first power supply terminal 21 of the present embodiment is formed as a generally flat metal plate and includes a motor connecting section 21a, a connector pin section 21b and a lead section 21c. The motor connecting section 21a is formed as the one end of the first power supply terminal 21. The connector pin section 21b is formed as the other end of the first power supply terminal 21 and is received in the connector housing part 13b. The lead section 21c connects between the motor connecting section 21a and the connector pin section 21b. As shown in FIGS. 8A and 8B, a cranked section 21d is bent and is formed in the connector pin section (other end) 21b side of the first power supply terminal 21 to serve as a supportive engaging section, which is engaged with a portion of the unit plate 14. Furthermore, slits 21e are formed in the lead section 21c of the first power supply terminal 21 to clamp (to secure) corresponding terminals of the noise limiter elements (first and second capacitors 26, 27) upon insertion thereof into the slits 21e. In the present embodiment, each slit 21e is formed by cutting an end of a corresponding projection 21f, which is bent relative to a plane of the lead section 21c. Furthermore, spikes 21g are formed in each of the ends of the first power supply terminal 21 in such a manner that each spike 21g projects in a widthwise direction of the flat metal plate (i.e., a direction perpendicular to a longitudinal direction of the flat metal plate in a plane of the flat metal plate). The second power supply terminal 22 has a similar structure (i.e., provided with a motor connecting section 22a, a connector pin section 22b, a lead section 22c, a cranked section, slits 22e and spikes 22g), which is substantially the same as the first power supply terminal 21. Thus, detailed description of the second power supply terminal 22 will be eliminated for the sake of simplicity.

The first to third stationary contact terminals 23–25 are constructed in such a manner that one end of each stationary contact terminal 23–25 is arranged in an intermediate point of the unit plate 14, and the other end of each stationary contact terminal 23–25 is connected to a corresponding terminal of the external connector, which is engaged with the connector housing part 13b. Each of the first to third stationary terminals 23–25 is formed as a generally flat metal plate and includes a stationary contact connecting section 23a–25a (FIG. 6), a connector pin section 23b–25b and a lead section. The stationary contact connecting section 23a–25a is formed as the one end of the stationary contact terminal 23–25. The connector pin section 23b–25b is formed as the other end of the stationary contact terminal 23–25 and is received in the connector housing part 13b. The lead section connects between the stationary contact connecting section 23a–25a and the connector pin section 23b–25b. Each of the first to third stationary contact terminals 23–25 has spikes, which are similar to those of the first and second power supply terminals 21, 22. Furthermore, the first stationary contact terminal 23 includes an extension 23c, which extends to a location that corresponds to the slits 21e, 22e of the first and second power supply terminals 21, 22. Also, the extension 23c includes slits 23d that are similar to the slits 21e, 22e.

As shown in FIG. 7, a receiving recess (receiving portion) 14f, which can receive the first and second power supply terminals 21, 22 and the first to third stationary contact terminals 23–25, is formed in the one side surface of the unit plate 14, which is opposed to the housing cover 13. In the present embodiment, the receiving recess 14f and the spikes 21g of each electric circuit component 21–25 constitute an engageable retainer arrangement. The first and second power supply terminals 21, 22 and the first to third stationary contact terminals 23–25 are received in the receiving recess 14f and are retained therein through engagement of each spike 21g with a corresponding inner wall part of the receiving recess 14f. At this state, the connector pin sections 21b–25b of the first and second power supply terminals 21, 22 and of the first to third stationary contact terminals 23–25 protrude from the connector housing part 13b side end of the unit plate 14.

The first and second capacitors 26, 27 are provided to remove or restrain (damp) noises generated in power supply brushes. As shown in FIG. 7, noise limiter element receiving recesses 14g, which can receive the first and second capacitors 26, 27 and serve as possible installation positions, are formed in the one side surface of the unit plate 14, which is opposed to the housing cover 13. In the present embodiment, the number of the noise limiter element receiving recesses 14g, each of which can receive the corresponding capacitor, is three. A sight hole 14h is formed through the bottom surface of each noise limiter element receiving recess 14g of the unit plate 14 to allow visual check of presence of the corresponding capacitor 26, 27 from an unopposed surface side of the unit plate 14, which is not opposed to the housing cover 13. When the first and second capacitors 26, 27 are received in the two noise limiter element receiving recesses 14g, respectively, the terminals of the capacitors 26, 27 are clamped by the slits 21e, 22e of the first and second power supply terminals 21, 22 and the slits of the first stationary contact terminal 23. In the present embodiment, although the three noise limiter element receiving recesses 14g are provided, and the two slits 21e, 22e are formed in each of the first and second power supply terminals 21, 22, the motor 1 is constructed to use only two of the three noise limiter element receiving recesses 14g and only one of the two slits 21e, 22e of each power supply terminal 21, 22. That is, in the present embodiment, the motor 1 is constructed to allow accommodation of the three capacitors.

Furthermore, when the unit plate 14 is installed to the housing cover 13, the first and second power supply terminals 21, 22, the first to third stationary contact terminals 23–25 and the first and second capacitors 26, 27 are engaged (partially contacted) with the housing cover 13 to restrain detachment thereof or vibration thereof.

As shown in FIG. 6, each of the first to third stationary contact members 28–30 is formed as a generally flat metal plate and includes a support section 28a–30a, a contact section 28b–30b and a lever section 28c–30c. Here, the support section 28a–30a and the contact section 28b–30b are one end and the other end, respectively, of the stationary contact member 28–30. The support section 28a–30a is connected to the stationary contact connection section 23a–25a of a corresponding one of the first to third stationary contact terminals 23–25. The lever section 28c–30c connects between the support section 28a–30a and the contact section 28b–30b. The lever section 28C–30C is resilient and extends obliquely away from the plane of the unit plate 14. Among the contact sections 28b–30b, the contact section 29b is bulged in a semispherical form in a direction away from the plane of the unit plate 14. Furthermore, among the contact sections 28b–30b, each of the contact sections 28b, 30b is provided with a conductive pin, which has a relatively small diameter, at a distal end of the corresponding lever section 28c, 30c to improve measurement accuracy of the contact over the contact section 29b. The first to third stationary contact members 28–30 extend parallel to one another, and the contact sections 28b–30b are aligned along a straight line, which radially extends from the spindle 14a.

As shown in FIG. 9, the thus constructed unit plate 14 is inserted downward from a top side (i.e., is inserted in the closing direction from a front side of FIG. 9) into the unit receiving recess 13a of the housing cover 13 and is received by the inner surface of the housing cover 13. At this time, the unit plate 14 is inserted in a manner that prevents collision of the connector pin sections 21b–25b of the first and second power supply terminals 21, 22 and of the first to third stationary contact terminals 23–25 against the connector housing part 13b and that also prevents collision of the unit side temporal retainer 14c against the cover side temporal retainer 13e. Also, at this time, the first and second lateral surfaces S1, S2 of the unit plate 14 are engaged with the first and second guide walls 13c, 13d, respectively, of the housing cover 13.

Next, the unit plate 14 is guided along the first and second guide walls 13c, 13d and is slid in the direction (i.e., the direction, which is obliquely and left-downwardly directed in FIG. 9 and coincides with the direction of the axis β2) perpendicular to the closing direction of the housing cover 13. Then, when the unit plate 14 reaches the guide end position (i.e., when the unit plate 14 is placed in the position shown in FIG. 10), the claw 14d of the unit side temporal retainer 14c is engaged with the cover side temporal retainer 13e in a manner that restrains detachment of the claw 14d from the cover side temporal retainer 13e. Furthermore, because of engagement between the intermediate point of the unit side temporal retainer 14c and the cover side temporal retainer 13e in the closing direction (i.e., the direction perpendicular to the plane of FIG. 10) and also because of insertion of the connector housing part 13b side end of the unit plate 14 into the connector housing part 13b, the movement of the unit plate 14 in the closing direction is limited. Thus, the unit plate 14 is temporarily retained by the housing cover 13. Furthermore, at this time, the connector pins 21b–25b of the first and second power supply terminals 21, 22 and of the first to third stationary contact terminals 23–25 are received in the connector housing part 13b.

As shown in FIG. 11, the rotator 15 is rotatably supported by the rotation support arrangement of the unit plate 14 (i.e., the spindle 14a and the peripheral wall 14b). Specifically, as shown in FIGS. 3 and 11, the rotator 15 includes a disc section 15a and a shaft section 15c. The shaft section 15c is shaped into a generally cup form that protrudes from the center of the disc section 15a. The shaft section 15c includes a shaft hole 15b in the base center thereof. More specifically, the disc section 15a of the rotator 15 is annular, and the shaft section 15c of the rotator 15 includes a tubular wall (tubular part) 15c1 and a base wall 15c2. One end of the tubular wall 15c1 is connected to an inner peripheral edge of the annular disc section 15a, and the base wall 15c2 extends radially inwardly from the other end of the tubular wall 15c1. The base wall 15c2 of the shaft section 15c has the shaft hole 15b that extends through the base wall 15c2 along a rotational axis of the rotator 15. A movable contact (indicated by a dotted line in FIG. 3) 31, which is made of a conductive plate that is configured to have a predetermined pattern, is secured to a bottom surface 15d of the disc section 15a (i.e., a surface located on a side, from which the shaft section 15c extends). As shown in FIG. 11, the spindle 14a is received through the shaft hole 15b of the rotator 15, and the tubular part 15c1 of the shaft section 15c is radially inwardly fitted to the peripheral wall 14b and is rotatably supported by the peripheral wall 14b. Then, at this state, a detachment preventing member (such as a washer) 32 is secured to the spindle 14a, so that the rotator 15 is rotatably supported. At this time, the contact sections 28b–30b of the first to third stationary contact members 28–30 are urged by the urging force of the lever sections 28c–30c against the bottom surface 15d (the movable contact 31) of the disc section 15a. The first to third stationary contact members 28–30 output an electrical signal, which corresponds to a rotational position of the output shaft 16, through engagement and disengagement between the contact sections 28b–30b of the first to third stationary contact members 28–30 and the movable contact 32.

The housing cover 13, to which the unit plate 14 and the rotator 15 are secured, is secured to the housing 11 to close the opening 45 of the housing 11 (more specifically, the worm receiving recess 11a and the wheel receiving recess 11b). At this time, the engaging wall 11c of the housing 11 is fitted between the two engaging walls 14e of the unit plate 14. In this way, the movement of the unit plate 14 in the direction (i.e., the guide direction) perpendicular to the closing direction of the housing cover 13 is substantially limited. Furthermore, at this time, the rotator 15 is integrally rotatably connected to the worm wheel 12 (more specifically, the output shaft) through engagement between a connecting protrusion 15f, which is provided in a top surface 15e (i.e., the surface located on a side that is opposed to the worm wheel 12) of the rotator 15, and a connecting protrusion (not shown), which is provided in the worm wheel 12.

Figure 12:
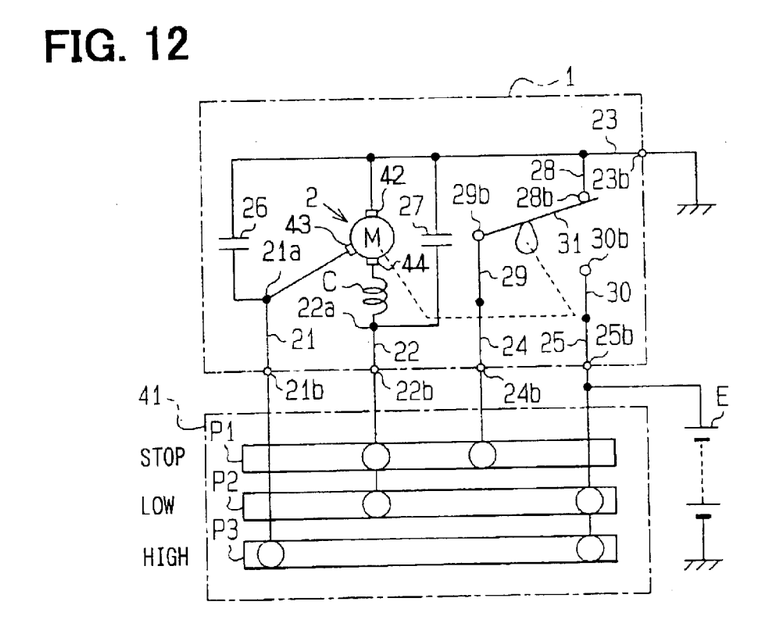
FIG. 12 is a circuit diagram showing electrical arrangement of the present embodiment.

Next, electrical wiring of the motor 1 (wiper motor) installed in a vehicle will be described with reference to FIG. 12.

The motor connecting sections 21a, 22a of the first and second power supply terminals 21, 22 are connected to the power supply brushes (i.e., a high speed power supply brush 43 and a low speed power supply brush 44, respectively) of the motor main body 2, and the connector pin sections 21b, 22b of the first and second power supply terminals 21, 22 are connected to a shift switch 41, which is provided in a vehicle driver's seat side. In the present embodiment, a choke coil C, which is arranged in a brush holder member (not shown) of the motor main body 2, is connected in series between the motor connecting section 22a of the second power supply terminal 22 and the low speed power supply brush 44.

The connector pin section 23b of the first stationary contact terminal 23 is grounded. Furthermore, a ground brush 42 of the motor main body 2 is grounded. The connector pin sections 24b, 25b of the second and third stationary contact terminals 24, 25 are connected to the shift switch 41. The connector pin 25b of the third stationary contact terminal 25 is connected to a power source E (vehicle battery).

The shift switch 41 includes a stop position P1 for stopping the motor 1, a low speed position P2 for operating the motor 1 at a low speed, and a high speed position P3 for operating the motor 1 at a high speed. At the stop position P1, the shift switch 41 connects between the second power supply terminal 22 and the second stationary contact terminal 24. At the low speed position P2, the shift switch 41 connects the second power supply terminal 22 to the power source E and to the third stationary contact terminal 25. At the high speed position P3, the shift switch 41 connects the first power supply terminal 21 to the power source E and to the third stationary contact terminal 25.

In the thus constructed motor 1, when the shift switch 41 is shifted to the low speed position P2, the low speed power supply brush 44 is connected to the power source E, so that the motor 1 is operated at the low speed. That is, the worm wheel 12 and the rotator 15 are rotated at the low speed. Thus, each wiper arm (each wiper blade) is operated through, for example, the link mechanism, to perform a wiping movement (reciprocal movement) at the low speed.

When the shift switch 41 is shifted to the high speed position P3, the high speed power supply brush 43 is connected to the power source E, so that the motor 1 is operated at the high speed. That is, the worm wheel 12 and the rotator 15 are rotated at the high speed. Thus, the wiper arm (wiper blade) is operated through, for example, the link mechanism to perform the wiping movement (reciprocal movement) at the high speed.

When the shift switch 41 is shifted from the low speed position P2 or the high speed position P3 to the stop position P1, the low speed power supply brush 44 (second power supply terminal 22) and the second stationary contact terminal 24 are connected one another. At this time, when the movable contact 31 (worm wheel 12) is positioned in a predetermined angular position (position for connecting between the contact section 28b and the contact section 29b), the second stationary contact terminal 24, which is connected to the low speed power supply brush 44, is connected to the ground brush 42 through the first stationary contact terminal 23 and is grounded (FIG. 12), so that the motor 1 is stopped. Furthermore, at this time, when the movable contact 31 (worm wheel 12) is displaced from the predetermined angular position and is placed in a position for connecting between the contact section 29b and the contact section 30b, the second stationary contact terminal 24, which is connected to the low speed power supply brush 44, is connected to the power source E. Thus, the motor 1 is operated at the low speed. Then, when the movable contact 31 (worm wheel 12) is rotated to the predetermined angular position, the second stationary contact terminal 24, which is connected to the low speed power supply brush 44, is connected to the ground brush through the first stationary contact terminal 23 and is grounded (FIG. 12), so that the motor 1 is stopped. When the movable contact 31 (worm wheel 12) is positioned in the predetermined angular position (position shown in FIG. 12), the wiper arm (wiper blade) is placed in a predetermined stop position located along the lower edge of the front window glass (windshield). Thus, when the shift switch 41 is shifted from the low speed position P2 or the high speed position P3 to the stop position P1, the wiper arm (wiper blade) is moved to the predetermined stop position located along the lower edge of the front window glass and is then stopped automatically.

Advantages of the above embodiment will be described.

(1) The housing cover 13 includes the first and second guide walls 13c, 13d that guide the unit plate 14 in the direction, which is perpendicular to the closing direction and coincides with the fitting direction of the external connector (i.e., the direction, which is obliquely and left-downwardly directed in FIG. 9 and coincides with the direction of the axis β2), to guide and to place the connector pin sections 21b–25b in the connector housing part 13b. Thus, through the simple positioning of the unit plate 14 to engage with the first and second guide walls 13c, 13d and then through the simple sliding movement of the unit plate 14 along the first and second guide walls 13c, 13d, the unit plate 14 can be installed to the housing cover 13. In this way, the installation of the unit plate 14 is eased. Thus, for example, in a case of automatic assembly, a corresponding assembly device can be simplified. For example, the assembly device is only required to move the unit plate 14 in the closing direction to place the unit plate 14 between the first guide wall 13c and the second guide wall 13d and then to move the unit plate 14 in the direction perpendicular to the closing direction (i.e., the assembly device is only required to perform the two simple movements in the two directions, which are perpendicular to each other). Furthermore, when the unit plate 14 is moved in the direction perpendicular to the closing direction, the unit plate 14 is guided by the first and second guide walls 13c, 13d. Thus, it is only required to urge the unit plate 14 in the direction generally perpendicular to the closing direction without requiring a precise positional control of the unit plate 14.

(2) At the guide end position of the unit plate 14 guided by the first and second guide walls 13c, 13d, the unit side temporal retainer 14c and the cover side temporal retainer 13e are engaged one another, and the connector housing part 13b side end of the unit plate 14 is fitted into the connector housing part 13b, so that the unit plate 14 and the housing cover 13 are temporarily retained together. Thus, in the assembled state where the unit plate 14 and the housing cover 13 are assembled together (i.e., in the state before installation of the housing cover 13, to which the unit plate 14 is installed, to the housing 11), the handling of the unit plate 14 and the housing cover 13 is eased. For example, detachment of the unit plate 14 and the housing cover 13 from one another is restrained even when the unit plate 14 and the housing cover 13 are transported. Furthermore, the engagement between the unit side temporal retainer 14c and the cover side temporal retainer 13e and the engagement between the connector housing part 13b side end of the unit plate 14 and the connector housing part 13b are achieved by moving the unit plate 14 to the guide end position. Thus, the above temporal retainment can be achieved without performing another operation for attaining the temporal retainment.

(3) When the housing cover 13, to which the unit plate 14 is secured, is secured to the housing 11, the engaging wall 11c of the housing 11 is fitted (engaged) between the two engaging walls 14e of the unit plate 14. In this way, without requiring provision of another member, the movement of the unit plate 14 in the guide direction can be substantially limited (restrained) with the simple arrangement.

(4) The cranked section 21d (supportive engaging section), which is engaged with the corresponding portion of the unit plate 14, is bent and is formed in the connector pin 21b, 22b side (the other end) of each of the first and second power supply terminals 21, 22, as shown in FIG. 8B. Thus, the force applied at the time of fitting the external connector is received by the cranked sections 21d, so that flexure, deformation or damage of the motor connecting section 21a, 22a of each of the first and second power supply terminals 21, 22 can be restrained. Furthermore, the engaging walls 14e, which restrain movement of the unit plate 14 in the guide direction, are arranged adjacent to the connector housing part 13b (adjacent to the cranked sections 21d), so that application of relatively large force to the entire unit plate 14 at the time of fitting the external connector is restrained. In this way, for example, application of relatively large force to the weak portion of the unit plate 14, such as the unit side temporal retainer 14c, can be restrained, and flexure, deformation or damage of the unit plate 14 can be restrained. Furthermore, the supportive engaging section, which is engaged in a manner that restrains conduction of the external force applied to the connector pin section 21a, 22a at the time of fitting the external connector to the motor connecting section 21a, 22a, is made as the cranked section 21d. Thus, while the supportive engaging section has the relatively simple shape, relatively large force applied at the time of fitting the external connector can be effectively received by the supportive engaging section.

(5) The first to third stationary contact members 28–30, each of which has the contact section 28b–30b that is slidably engageable with the movable contact 31, are secured to the unit plate 14. Furthermore, the rotation support arrangement (i.e., the spindle 14a and the peripheral wall 14b), which rotatably supports the rotor 15 having the movable contact 31, is formed in the unit plate 14. Thus, unlike the prior art, a positional relationship between the movable contact 31 and the first to third stationary contact members 28–30 is not affected by assembly errors of the unit plate 14. As a result, the measurement accuracy of the rotational angle of the output shaft (worm wheel 12), which is measured through the movable contact 31 and the first to third stationary contact members 28–30, can be improved. Therefore, each wiper arm (wiper blade), which is connected to the motor through the link mechanism, can be stopped at the predetermined stop position with high accuracy.

(6) The tubular part of the shaft section 15c of the rotor 15 is radially inwardly fitted to and is supported by the peripheral wall 14b of the unit plate 14. Thus, even when the rotor 15 receives urging forces from, for example, the first to third stationary contact members 28–30 causing deviate the rotor 15 with respect to the spindle 14a, tilting of the rotational axis of the rotor 15 is restrained. As a result, the measurement accuracy of the rotational angle of the output shaft (worm wheel 12), which is measured through the movable contact 31 and the first to third stationary contact members 28–30, can be further improved.

(7) Since the rotation support arrangement (the spindle 14a and the peripheral wall 14b) is provided in the unit plate 14, it is relatively easy to make the unit plate 14 slidable relative to the housing cover 13. Thus, the unit plate 14 can be easily installed in such a manner that the connector pin sections 21b–25b of the first and second power supply terminals 21, 22 and of the first to third stationary contact terminals 23–25 are received in the connector housing part 13b. That is, in the case of, for example, the prior art (Japanese Unexamined Patent Publication No. 8-275441) where the rotation support arrangement protrudes from the surface of the housing cover, the unit plate cannot be installed to the housing cover through simple directional movements of the unit plate, such as the movement of the unit plate in the closing direction and the movement of the unit plate in the direction perpendicular to the closing direction, since the rotation support arrangement blocks such movements. However, according to the preset embodiment, there is not such a problem.

(8) The electric circuit components 21–27 other than the first to third stationary contact members 28–30 are arranged in the one side surface of the unit plate 14, which is opposed to the housing cover 13, i.e., which is not opposed to the movable contact 31. Thus, even when the size of the motor 1 is reduced (is thinned) by, for example, reducing a space between the unit plate 14 and the movable contact 31, it is possible to prevent interference between the electric circuit components 21–27 other than the first to third stationary contact members 28–30 and the movable contact 31 and also to achieve electrical insulation between them with the simple structure. For example, even when a distance between the movable contact 31 and the unit plate 14 is slightly deviated from a predetermined value due to, for example, vibrations of the vehicle, the electrical insulation between the movable contact 31 and the electric circuit components 21–27 can be effectively achieved.

(9) The unit plate 14 includes the receiving recess 14f, which can receive the electric circuit components (i.e., the first and second power supply terminals 21, 22 and the first to third stationary contact terminals 23–25) other than the first to third stationary contact members 28–30 and the first and second capacitors 26, 27. Furthermore, the spikes 21g, which project in the widthwise directions of the flat metal plate, are provided in the electric circuit components 21–25. The spikes 21g of the electric circuit components 21–25 are engaged with the receiving recess 14f of the unit plate 14 upon installation of the electric circuit components 21–25 to the receiving recess 14f, so that both the electric circuit components 21–25 and the unit plate 14 are retained together. Thus, the electric circuit components 21–25 can be easily installed.

(10) The unit plate 14 (more specifically, the noise limiter element receiving recesses 14g) has the sight holes 14h, through which presence of the first and second capacitors 26, 27 can be visually checked from the other side surface (second side surface) of the unit plate 14, which is not opposed to the housing cover 13, i.e., which is opposed to the movable contact 31. Thus, even when the unit plate 14 is secured to the housing cover 13 while the one side surface of the unit plate 14, in which the electric circuit components 21–27 are arranged, is opposed to the inner surface of the housing cover 13, the presence of the first and second capacitors 26, 27 can be visually checked (i.e., visually confirmed). Furthermore, since each sight hole 14$h$ is provided in a corresponding one of the noise limiter element receiving recesses 14$g$ (i.e., each sight hole 14$h$ is provided for a corresponding one of the capacitors), it is possible to visually easily check (i.e., understand) the number of capacitors actually received in the noise limiter element receiving recesses 14$g$. For example, in the present embodiment, although the motor 1 is constructed to have the two capacitors (i.e., first and second capacitors 26, 27), it is possible to easily distinguish such a motor from the motor, which is constructed to have three capacitors in the same type of unit plate 14 (i.e., the three noise limiter element receiving recesses 14$g$ receive three capacitors, respectively) while the unit plate 14 is secured to the housing cover 13.

(11) Each of the first and second power supply terminals 21, 22 formed from the flat metal plate includes the slits 21$e$, 22$e$, which are provided in the lead section 21$c$, 22$c$ located between the motor connecting section 21$a$, 22$a$ and the connector pin section 21$b$, 22$b$ to connect therebetween and are capable of clamping corresponding terminals of the first and second capacitors 26, 27 upon insertion thereof. Thus, fixation of the terminals of the first and second capacitors (i.e., the noise limiter elements) 26, 27 by soldering is not required, and the first and second capacitors 26, 27 can be easily connected and secured.

(12) While the unit plate 14 is installed to the housing cover 13, the first and second power supply terminals 21, 22, the first to third stationary contact terminals 23–25 and the first and second capacitors 26, 27 are engaged with the housing cover 13 and are restrained form detachment and generation of vibrations. Thus, detachment of the electric circuit components 21–27 other than the first to third stationary contact members 28–30 can be restrained without providing another member.

The above embodiment can be modified as follows.

In the above embodiment, the unit plate 14 and the housing cover 13 are temporarily retained together through the engagement between the unit side temporal retainer 14$c$ and the cover side temporal retainer 13$e$ and also through insertion of the connector housing part 13$b$ side end of the unit plate 14 into the connector housing part 13$b$. However, the unit plate 14 and the housing cover 13 can be temporarily retained together through any other arrangement. For example, the unit side temporal retainer 14$c$ can be one that is made of a non-deformable material without the claw 14$d$ and is engageable with the cover side temporal retainer 13$e$ only in the closing direction, and the connector housing part 13$b$ side end of the unit plate 14 can be lightly press fitted into the connector housing part 13$b$. Here, the "lightly press fitting" of the connector housing part 13$b$ side end of the unit plate 14 means press fitting of the connector housing part 13$b$ side end of the unit plate 14 into the connector housing part 13$b$ at a level that does not cause detachment of the connector housing part 13$b$ side end of the unit plate 14 from the connector housing part 13$b$ even through, for example, transportation thereof. Alternatively, the unit side temporal retainer 14$c$ can be one that is made of the non-deformable material without the claw 14$d$ and is lightly press fitted into the cover side temporal retainer 13$e$ (i.e., press fitted at a level that does not cause detachment even through, for example, transportation thereof). Even with this arrangement, the unit plate 14 and the housing cover 13 can be temporarily retained together. Furthermore, the shape of the unit side retainer can be simplified and can be easily manufactured. Also, since the unit side temporal retainer 14$c$ of the above embodiment is the resiliently deformable and is elongated, the entire unit plate 14 needs to be made of the material having a predetermined rigidity. However, when the unit side temporal retainer 14$c$ is made as the non-deformable retainer 14$c$, as described above, the unit plate 14 can be made of a material having a relatively low rigidity.

In the above embodiment, the unit plate 14 and the housing cover 13 are temporarily retained together. However, the unit plate 14 and the housing cover 13 can be modified to disallow the temporal retainment of the unit plate 14 and the housing cover 13 together (i.e., the unit plate 14 and the housing cover 13 are not provided with the unit side temporal retainer 14$c$ and the cover side temporal retainer 13$e$). Even with this modification, advantages similar to those discussed in (1), (3)–(12) can be achieved. Furthermore, in this way, the unit plate 14 and the housing cover 13 can be formed in simple forms.

In the above embodiment, when the housing cover 13 is secured to the housing 11, the engaging wall 11$c$ of the housing 11 is fitted between the two engaging walls 14$e$ of the unit plate 14. However, as long as the movement of the unit plate 14 in the guide direction is restrained upon closing of the opening 45 of the housing 11 by the housing cover 13, the above arrangement can be modified to any other form. Even with such a modification, advantages similar to those discussed with respect to the above embodiment can be achieved. Furthermore, the above arrangement can be modified to any other form that restrains movement of the unit plate 14 in the guide direction without requiring closing of the opening 45 of the housing 11 by the housing cover 13.

The cranked section 21$d$ of the above embodiment can be modified to any other form (construction) of supportive engaging section as long as the supportive engaging section is engaged with the unit plate 14 in such a manner that conduction of the external force applied to the connector pin section 21$b$, 22$b$ at the time of fitting the external connector to the motor connecting section 21$a$, 22$a$ is restrained. For example, the supportive engaging section 21$d$ can be modified to a supportive engaging section that extends in the widthwise direction of the flat metal plate to engage with the unit plate 14. Even with this modification, flexure, deformation or damage of the motor connecting section of each of the first and second power supply terminals can be restrained.

In the above embodiment, the rotator 15 includes the shaft section 15$c$, which is shaped into the generally cup form that is protruded, and the tubular part 15$c$1 of the shaft section 15$c$ is radially inwardly fitted to the peripheral wall 14$b$ of the unit plate 14 to ratably support the rotator 15. However, the rotator 15 can be supported by any other arrangement. For example, a hole can be formed in the rotator 15, and a spindle, which serves as the rotation support arrangement, can be formed in the unit plate 14 and can be inserted in the hole of the rotator 15 to rotatably support the rotator 15. Even with this modification, advantages similar to those discussed in (1)–(5), (7)–(12) can be achieved.

In the above embodiment, the electric circuit components 21–27 other than the first to third stationary contact members 28–30 are provided in the one side surface of the unit plate 14, which is opposed to the housing cover 13 of the unit plate 14, i.e., which is not opposed to the movable contact 31. However, the electric circuit components 21–27 can be arranged in any other fashion. For example, the electric circuit components 21–27 can be arranged in the other side surface of the unit plate 14, which is opposed to the movable contact 31. Alternatively, the electric circuit components can be insert molded into the unit plate. Even with this modification, advantages similar to those discussed in (1)–(7) can be achieved.

In the above embodiment, the unit plate 14 (more specifically, the noise limiter element receiving recesses 14g) has the sight holes 14h, through which presence of the first and second capacitors 26, 27 can be visually checked from the other side surface of the unit plate 14, which is not opposed to the housing cover 13, i.e., which is opposed to the movable contact 31. However, the unit plate 14 can be modified to a unit plate that has no sight hole 14h. Even with this modification advantages similar to those discussed in (1)–(9), (11), (12) can be achieved. Furthermore, in the above embodiment, each sight hole 14h is provided in the corresponding one of the noise limiter element receiving recesses 14g (i.e., each sight hole 14h is provided for the corresponding one of the capacitors). However, the sight hole 14h can be formed only in the required noise limiter element receiving recess 14g, which requires visual check (e.g., noise limiter element receiving recesses 14g that receive/does not receive the corresponding capacitor according to the corresponding specification).

In the above embodiment, the invention is embodied in the wiper motor of the vehicle wiper system. However, the invention can be embodied in a motor used in any other device. Furthermore, the movable contact 31 and the first to third stationary contact members 28–30 are constructed to measures the rotational angle of the output shaft (worm wheel 12) and are constructed as the switch that directly controls power supply to the motor main body 2. However, when the invention is embodied in the other devices, the movable contact 31 and the first to third stationary contact members 28–30 can be formed as ones that are constructed to measure the rotational angle of the output shaft and to output the measured signal indicating the measured rotational angle.

In the above embodiment, the unit plate 14 is installed to the housing cover 13 through the slide movement of the unit plate 14 relative to the housing cover 13. However, as long as the first to third stationary contact members 28–30 and the rotation support arrangement (i.e., the spindle 14a and the peripheral wall 14b) are provided, the unit plate can be any other type of unit plate that is installed to the housing cover 13 in a different manner. Even with this modification, advantages similar to those discussed in (5), (6), (8)–(12) can be achieved.

In the above embodiment, the slits 21e, 22e, which can clamp the terminals of the first and second capacitors 26, 27 upon insertion the terminals in the slits 21e, 22e, are formed in the lead sections 21c, 22c of the first and second power supply terminals 21, 22. However, the first and second capacitors 26, 27 can be held and connected through any other structure. Even with this modification, advantages similar to those discussed in (1)–(10) can be achieved.

In the above embodiment, the electric circuit components 21–27 other than the first to third stationary contact members 28–30 are engaged (partially engaged) with the housing cover 13 while the unit plate 14 is installed to the housing cover 13, so that detachment of the electric circuit components 21–27 from the housing cover 13 is restrained. However, the detachment of the electric circuit components 21–27 from the housing cover 13 can be restrained with any other structure. Even with this modification, advantages similar to those discussed in (1)–(11) can be achieved.

In the above embodiment, the first and second power supply terminals 21, 22, the first to third stationary contact terminals 23–25 and the first and second capacitors 26, 27 are indicated as the electric circuit components 21–27 other than the first to third stationary contact members 28–30. However, these electric circuit components can be changed to any other suitable electric circuit components secured to the unit plate. For example, electric circuit components, such as a choke coil and a semiconductor element, can be secured to the unit plate. In such a case, the electric circuit components, such as the choke coil and the semiconductor element, can be arranged in the one side surface of the unit plate, which is opposed to the housing cover 13 of the unit plate, i.e., which is not opposed to the movable contact 31. Even with this modification, electrical insulation between the movable contact 31 and the electric circuit components (e.g., the choke coil and the semiconductor element) other than the stationary contact members 28–30 can be achieved.

In the above embodiment, the first and second guide walls 13c, 13b are provided in the housing cover 13 to guide the unit plate 14 in such a manner that the connector pin section 21b–25b are received in the connector housing part 13b. However, the housing cover can be modified to have none of the first and second guide walls 13c, 13d. Even with this modification, advantages similar to those discussed in (4)–(12) can be achieved.

Additional advantages and modifications will readily occur to those skilled in the art. The invention in its broader terms is therefore not limited to the specific details, representative apparatus, and illustrative examples shown and described.

What is claimed is:

1. An electric motor comprising:

a motor main body that includes a rotor and a plurality of brushes, through which electric current is supplied to the rotor;

a housing that is connected to the motor main body and includes an opening;

a speed reducing mechanism, which is received in the housing, wherein the speed reducing mechanism reduces rotational speed of the rotor and includes an output shaft to output rotational force;

a housing cover that is connected to the housing to close the opening of the housing and includes a connector housing part, to which an external connector is fitted in a fitting direction, wherein the connector housing part is shaped into a tubular form that extends in the fitting direction of the external connector; and a unit plate that is secured to the housing cover in opposed relationship to the housing and holds a plurality of electric circuit components, wherein:

the plurality of electric circuit components includes at least one power supply terminal that includes first and second ends, wherein the first end of each power supply terminal is connected to a corresponding one of the plurality of brushes, and the second end of each power supply terminal is connected to a corresponding terminal of the external connector; and the housing cover further includes at least one guide wall, which extends in a direction generally parallel to the fitting direction of the external connector to guide the unit plate in such a manner that the second end of each power supply terminal held by the unit plate is received in the connector housing part at time of installing the unit plate to the housing cover.

2. The electric motor according to claim 1, further comprising a temporal retainer arrangement, which temporarily retains the unit plate and the housing cover together when the unit plate is placed in a guide end position upon guiding of the unit plate along the at least one guide wall.

3. The electric motor according to claim 1, further comprising a slide limiting arrangement, which limits movement of the unit plate in the direction generally parallel to the fitting direction of the external connector when the housing cover, which holds the unit plate, is connected to the housing.

4. The electric motor according to claim 3, wherein:
the slide limiting arrangement includes:
  at least one engaging wall that is provided in the unit plate; and
  at least one engaging wall that is provided in the housing and is engaged with the at least one engaging wall of the unit plate when the housing cover, which holds the unit plate, is connected to the housing;
the second end of each power supply terminal includes a supportive engaging section, which is engaged with the unit plate in such a manner that the supportive engaging section restrains conduction of external force from the external connector to the first end of the power supply terminal through the second end of the power supply terminal when the external connector is fitted to the connector housing part; and
the at least one engaging wall of the unit plate is arranged adjacent to the supportive engaging section of each power supply terminal.

5. The electric motor according to claim 1, further comprising a rotator, which is rotated synchronously with rotation of the output shaft of the speed reducing mechanism, wherein the unit plate includes a rotation support arrangement, which rotatably supports the rotator.

6. The electric motor according to claim 5, wherein:
the rotator includes a movable contact, which is rotated together with the rotator and is made of a conductive plate that is configured to have a predetermined pattern;
the plurality of electric circuit components held by the unit plate further includes at least one stationary contact members, wherein each stationary contact member includes a contact section, which is slidably engageable with the movable contact; and
the at least one stationary contact member outputs an electrical signal, which corresponds to a rotational position of the output shaft, through engagement and disengagement between the contact section of the at least one stationary contact member and the movable contact.

7. The electric motor according to claim 6, wherein:
the rotator includes a disc section and a shaft section, wherein the movable contact is secured to the disc section, and the shaft section extends from the disc section; and
the rotation support arrangement includes a peripheral wall, which extends from the unit plate, wherein the shaft section of the rotator is placed radially inward of the peripheral wall of the rotation support arrangement and is rotatably supported by the peripheral wall of the rotation support arrangement.

8. The electric motor according to claim 6, wherein:
the unit plate is made of a dielectric material and has first and second side surfaces, wherein the first side surface of the unit plate is opposed to the housing cover, and the second side surface of the unit plate is opposed to the movable contact;
the unit plate includes a receiving portion, which is provided in the first side surface of the unit plate and receives the plurality of electric circuit components other than the at least one stationary contact member.

9. The electric motor according to claim 8, wherein:
the plurality of electric circuit components further includes at least one noise limiter element, which restrains generation of electric noises from the electric motor; and
the unit plate includes at least one sight hole, which penetrates through the unit plate, and presence of each noise limiter element can be visually checked from the second side surface of the unit plate through a corresponding one of the at least one sight hole.

10. The electric motor according to claim 1, wherein the electric motor is for reciprocating at least one wiper blade, which wipes a windshield of a vehicle, by rotational force outputted from the output shaft of the speed reducing mechanism.

11. An electric motor comprising:
a motor main body that includes a rotor and a plurality of brushes, through which electric current is supplied to the rotor;
a housing that is connected to the motor main body and includes an opening;
a speed reducing mechanism, which is received in the housing, wherein the speed reducing mechanism reduces rotational speed of the rotor and includes an output shaft to output rotational force;
a housing cover that is connected to the housing to close the opening of the housing;
a unit plate that is secured to the housing cover in opposed relationship to the housing and holds a plurality of electric circuit components; and
a rotator, which is rotated synchronously with rotation of the output shaft of the speed reducing mechanism and includes a movable contact, which is rotated together with the rotator and is made of a conductive plate that is configured to have a predetermined pattern, wherein:
the unit plate includes a rotation support arrangement, which rotatably supports the rotator; and
the plurality of electric circuit components includes at least one stationary contact member, wherein each stationary contact member includes a contact section, which is slidably engageable with the movable contact.

12. The electric motor according to claim 11, wherein:
the rotator includes a disc section and a shaft section, wherein the movable contact is secured to the disc section, and the shaft section extends from the disc section; and
the rotation support arrangement includes a peripheral wall, which extends from the unit plate, wherein the shaft section of the rotator is placed radially inward of the peripheral wall of the rotation support arrangement and is rotatably supported by the peripheral wall of the rotation support arrangement.

13. The electric motor according to claim 12, wherein:

the disc section of the rotator is annular;

the shaft section of the rotator includes a tubular wall and a base wall, wherein one end of the tubular wall is connected to an inner peripheral edge of the annular disc section, and the base wall extends radially inwardly from the other end of the tubular wall;

the base wall of the shaft section has a shaft hole that extends through the base wall along a rotational axis of the rotator; and the rotation support arrangement further includes a spindle, which extends from the unit plate along the rotational axis of the rotator at radially inward of the peripheral wall of the rotation support arrangement and is received through the shaft hole of the base wall of the shaft section.

14. The electric motor according to claim 11, wherein:

the unit plate is made of a dielectric material and has first and second side surfaces, wherein the first side surface of the unit plate is opposed to the housing cover, and the second side surface of the unit plate is opposed to the movable contact; and the unit plate includes a receiving portion, which is provided in the first side surface of the unit plate and receives the plurality of electric circuit components other than the at least one stationary contact member.

15. The electric motor according to claim 14, wherein:

the plurality of electric circuit components further includes at least one noise limiter element, which restrains generation of electric noises from the electric motor; and the unit plate includes at least one sight hole, which penetrates through the unit plate, and presence of each noise limiter element can be visually checked from the second side surface of the unit plate through a corresponding one of the at least one sight hole.

16. The electric motor according to claim 11, wherein:

the at least one electric circuit components further includes at least one power supply terminal that includes first and second ends, wherein the first end of each power supply terminal is connected to a corresponding one of the plurality of brushes, and the second end of each power supply terminal is connected to a corresponding terminal of the external connector; and the housing cover includes:
 a connector housing part, to which an external connector is fitted in a fitting direction, wherein the connector housing part is shaped into a tubular form that extends in the fitting direction of the external connector; and
 at least one guide wall, which extends in a direction generally parallel to the fitting direction of the external connector to guide the unit plate in such a manner that the second end of each power supply terminal held by the unit plate is received in the connector housing part at time of installing the unit plate to the housing cover.

17. The electric motor according to claim 16, further comprising a temporal retainer arrangement, which temporarily retains the unit plate and the housing cover together when the unit plate is placed in a guide end position upon guiding of the unit plate along the at least one guide wall.

18. The electric motor according to claim 16, further comprising a slide limiting arrangement, which limits movement of the unit plate in the direction generally parallel to the fitting direction of the external connector when the housing cover, which holds the unit plate, is connected to the housing.

19. The electric motor according to claim 18, wherein:

the slide limiting arrangement includes:
 at least one engaging wall provided in the unit plate; and
 at least one engaging wall that is provided in the housing and is engaged with the at least one engaging wall of the unit plate when the housing cover, which holds the unit plate, is connected to the housing;

the second end of each power supply terminal includes a supportive engaging section, which is engaged with the unit plate in such a manner that the supportive engaging section restrains conduction of external force from the external connector to the first end of the power supply terminal through the second end of the power supply terminal when the external connector is fitted to the connector housing part; and the at least one engaging wall of the unit plate is arranged adjacent to the supportive engaging section of each power supply terminal.

20. The electric motor according to claim 11, wherein:

the output shaft of the speed reducing mechanism is connected to at least one wiper blade, so that rotational force outputted from the output shaft of the speed reducing mechanism reciprocates the at least one wiper blade;

the at least one stationary contact member outputs an electrical signal, which corresponds to a rotational position of the output shaft, through engagement and disengagement between the contact section of the at least one stationary contact member and the movable contact; and the at least one wiper blade is stopped at a predetermined stop position in a windshield based on the electrical signal outputted from the at least one stationary contact member.

* * * * *